US008911916B2

(12) United States Patent
Sugiura et al.

(10) Patent No.: US 8,911,916 B2
(45) Date of Patent: Dec. 16, 2014

(54) FUEL CELL

(71) Applicant: Honda Motor Co., Ltd., Tokyo (JP)

(72) Inventors: Seiji Sugiura, Wako (JP); Hiroshi Shinkai, Wako (JP); Kenichi Tanaka, Wako (JP); Mihoko Kawaharada, Wako (JP); Kenta Urata, Wako (JP); Yukihito Tanaka, Wako (JP); Takashi Kato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 10 days.

(21) Appl. No.: 13/653,407

(22) Filed: Oct. 17, 2012

(65) Prior Publication Data

US 2013/0101916 A1   Apr. 25, 2013

(30) Foreign Application Priority Data

Oct. 20, 2011   (JP) .................................. 2011-230229

(51) Int. Cl.
| | | |
|---|---|---|
| *H01M 8/10* | (2006.01) | |
| *H01M 8/24* | (2006.01) | |
| *H01M 8/02* | (2006.01) | |

(52) U.S. Cl.
CPC ............ *H01M 8/242* (2013.01); *H01M 8/2465* (2013.01); *H01M 8/0247* (2013.01); *H01M 8/0273* (2013.01); *H01M 8/0297* (2013.01); *Y02E 60/521* (2013.01); *H01M 2008/1095* (2013.01)
USPC ........... 429/483; 429/463; 429/479; 429/480; 429/509; 429/510

(58) Field of Classification Search
None
See application file for complete search history.

(56) References Cited

U.S. PATENT DOCUMENTS

| | | | |
|---|---|---|---|
| 7,320,839 B2 | 1/2008 | Tsuji et al. | |
| 2008/0042654 A1* | 2/2008 | Kato | ............................. 324/425 |
| 2010/0047649 A1* | 2/2010 | Yamada et al. | ................. 429/30 |
| 2011/0136038 A1* | 6/2011 | Ishida et al. | .................. 429/480 |

FOREIGN PATENT DOCUMENTS

| | | |
|---|---|---|
| JP | 2006-210027 | 8/2006 |
| JP | 2006-260810 | 9/2006 |
| JP | 2008-041337 | 2/2008 |
| JP | 2010-003470 | 1/2010 |

\* cited by examiner

*Primary Examiner* — Milton I Cano
*Assistant Examiner* — Carmen Lyles-Irving
(74) *Attorney, Agent, or Firm* — Mori & Ward, LLP

(57) ABSTRACT

A fuel cell includes a membrane electrode assembly, a first separator, and a second separator. The membrane electrode assembly includes a solid polymer electrolyte membrane, a first electrode, a second electrode, and a resin frame member. The membrane electrode assembly includes a power generation section and a stepped section. The power generation section is located in an interior space of the resin frame member. The solid polymer electrolyte membrane is provided between the first electrode and the second electrode in the power generation section. The stepped section is located on an outer side of the first electrode. The solid polymer electrolyte membrane is provided between the second electrode and the resin frame member in the stepped section. A magnitude of an interference in the stepped section is set to be smaller than a magnitude of an interference in the power generation section.

16 Claims, 6 Drawing Sheets

(PRIOR ART)

FUEL CELL

CROSS-REFERENCE TO RELATED APPLICATIONS

The present application claims priority under 35 U.S.C. §119 to Japanese Patent Application No. 2011-230229, filed Oct. 20, 2011, entitled "Fuel Cell." The contents of this application are incorporated herein by reference in their entirety.

BACKGROUND OF THE INVENTION

1. Field of the Invention

The present disclosure relates to a fuel cell.

2. Discussion of the Background

In general, a solid polymer electrolyte fuel cell employs a solid polymer electrolyte membrane formed as a polymer ion exchange membrane. In the fuel cell, a membrane electrode assembly (MEA) is sandwiched between separators (bipolar plates), the membrane electrode assembly being formed by disposing an anode electrode and a cathode electrode on respective sides of the solid polymer electrolyte membrane, each electrode including a catalyst layer (electrode catalyst layer) and a gas diffusion layer (porous carbon). The fuel cell is used, for example, as an in-vehicle fuel cell stack which is obtained by stacking a predetermined number of unit cells.

In a membrane electrode assembly of this type, a so-called stepped MEA may be formed in such a manner that one gas diffusion layer is set to have a surface area smaller than that of the solid polymer electrolyte membrane, while the other gas diffusion layer is set to have a surface area equal to that of the solid polymer electrolyte membrane.

Normally, a large number of membrane electrode assemblies are stacked in a fuel cell stack, and it is desired that the membrane electrode assemblies be produced inexpensively in order to reduce production costs. Consequently, various proposals have been made to simplify the configuration, while reducing the amount of expensive solid polymer electrolyte membrane in use.

For example, the membrane electrode assembly disclosed in Japanese Unexamined Patent Application Publication No. 2008-41337 includes a membrane electrode assembled body 4 which, as illustrated in FIG. 6, has a polymer electrolyte membrane 1, a first electrode layer 2a disposed on one side of the electrolyte membrane 1, a first gas diffusion layer 3a disposed on the side of the first electrode layer 2a opposite to which the electrolyte membrane 1 is disposed, a second electrode layer 2b disposed on the other side of the electrolyte membrane 1, and a second gas diffusion layer 3b disposed on the side of the second electrode layer 2b opposite to which the electrolyte membrane 1 is disposed. The membrane electrode assembled body 4 is provided with a resin frame 5 so as to surround the lateral side of the electrolyte membrane 1 which includes the entire outer periphery of the electrolyte membrane 1 and at least part of the outer periphery of the first gas diffusion layer 3a and the second gas diffusion layer 3b.

The first gas diffusion layer 3a and the first electrode layer 2a are disposed on the surface of the electrolyte membrane 1 in such a manner that the entire outer periphery of the first gas diffusion layer 3a falls within the range of the outer periphery of the electrolyte membrane 1, and a surface area of the electrolyte membrane 1 is disposed between the outer periphery of the first electrode layer 2a and the outer periphery of the electrolyte membrane 1, along the entire outer periphery of the first electrode layer 2a.

The second gas diffusion layer 3b extends to at least part of an area opposite to the surface area along the entire outer periphery of the electrolyte membrane 1, and the resin frame 5 is fixed to at least part of the surface area.

SUMMARY OF THE INVENTION

According to one aspect of the present invention, a fuel cell includes a membrane electrode assembly, a first separator, and a second separator. The membrane electrode assembly includes a solid polymer electrolyte membrane, a first electrode, a second electrode, and a resin frame member. The solid polymer electrolyte membrane includes a first side surface and a second side surface opposite to the first side surface in a stacking direction. The first electrode is provided on the first side surface of the solid polymer electrolyte membrane and includes an electrode catalyst layer and a gas diffusion layer. The second electrode is provided on the second side surface of the solid polymer electrolyte membrane and includes an electrode catalyst layer and a gas diffusion layer. An outer dimension of the first electrode is set to be smaller than an outer dimension of the second electrode when viewed from the stacking direction. The resin frame member is provided to surround an outer periphery of the solid polymer electrolyte membrane. The membrane electrode assembly includes a power generation section and a stepped section. The power generation section is located in an interior space of the resin frame member. The solid polymer electrolyte membrane is provided between the first electrode and the second electrode in the power generation section. The stepped section is located on an outer side of the first electrode. The solid polymer electrolyte membrane is provided between the second electrode and the resin frame member in the stepped section. A magnitude of an interference in the stepped section is set to be smaller than a magnitude of an interference in the power generation section. The first separator is disposed on a first side of the membrane electrode assembly. The second separator is disposed on a second side of the membrane electrode assembly.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
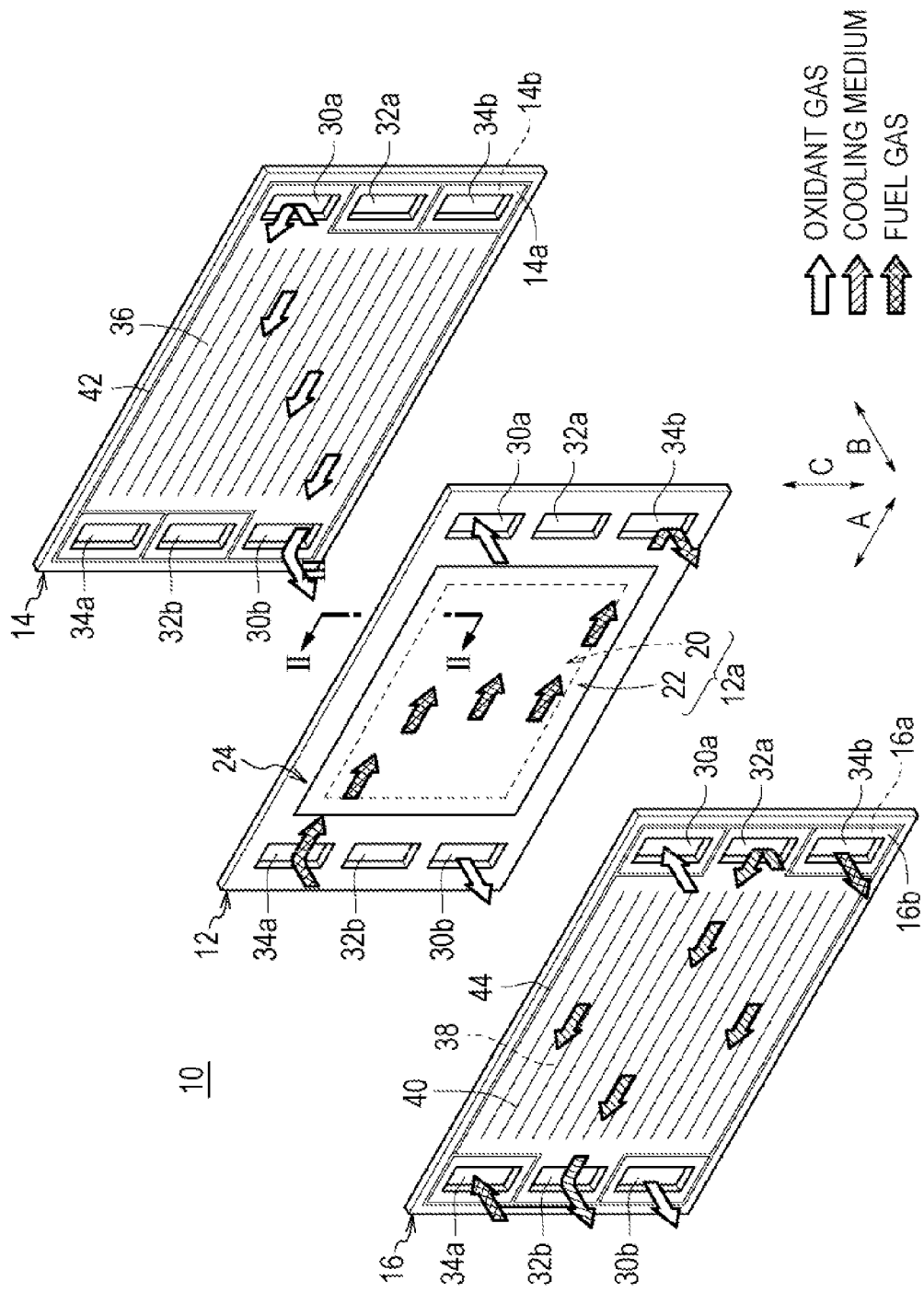
FIG. 1 is an exploded perspective view of the main part of a fuel cell according to an embodiment of the present disclosure.

The embodiments will now be described with reference to the accompanying drawings, wherein like reference numerals designate corresponding or identical elements throughout the various drawings.

Figure 2:
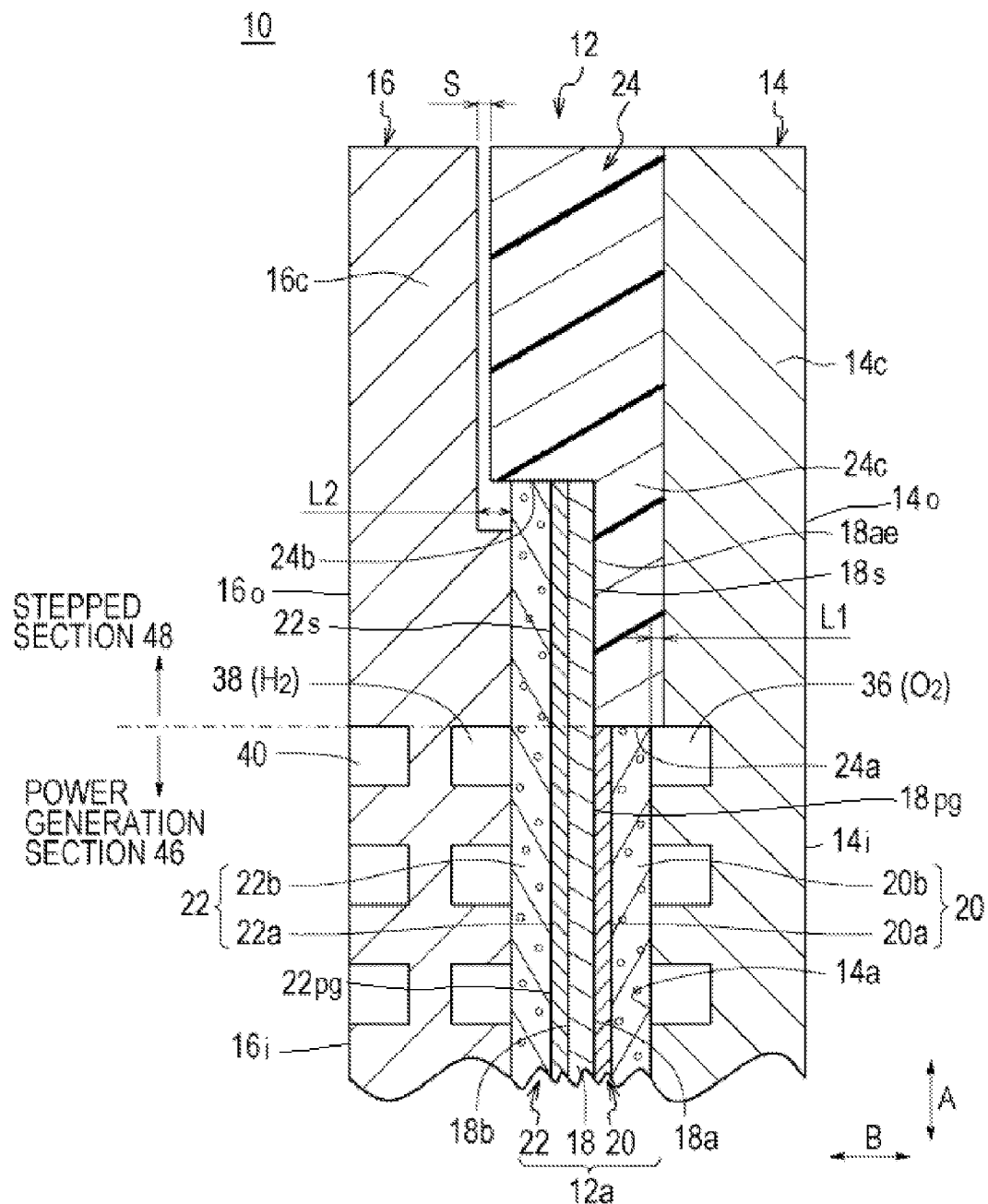
FIG. 2 is a cross-sectional view of the fuel cell taken along a line II-II in FIG. 1.

As illustrated in FIGS. 1 and 2, a fuel cell 10 according to an embodiment of the present disclosure includes a membrane electrode assembly with a resin frame 12, a cathode-side separator 14 and an anode-side separator 16 between which the membrane electrode assembly with a resin frame 12 is sandwiched.

The cathode-side separator 14 and the anode-side separator 16 are, for example, carbon separators. Instead of the carbon separators, the cathode-side separator 14 and the anode-side separator 16 may be metal separators which are formed by press-working a metal thin plate, for example.

As illustrated in FIG. 2, the membrane electrode assembly with a resin frame 12 includes a stepped MEA12a, which has a solid polymer electrolyte membrane 18, for example, a thin perfluoro sulfonic acid membrane impregnated with water, and a cathode electrode (a first electrode) 20 and an anode electrode (a second electrode) 22 between which the solid polymer electrolyte membrane 18 is sandwiched. A HC (hydrocarbon) based electrolyte in place of a fluorine-based electrolyte is used as the solid polymer electrolyte membrane 18.

Along the entire outer periphery, the cathode electrode 20 has a surface area smaller than those of the solid polymer electrolyte membrane 18 and the anode electrode 22. On the contrary the cathode electrode 20 may have a surface area larger than that of the anode electrode 22. The outer periphery of the solid polymer electrolyte membrane 18 may project outwardly from the outer periphery of a smaller electrode, for example, the cathode electrode 20, and may not be disposed at the same position as the end of a larger electrode, for example, the anode electrode 22.

The cathode electrode 20 is disposed on one surface 18a of the solid polymer electrolyte membrane 18, and an outer circumferential end 18ae of the solid polymer electrolyte membrane 18 is exposed in a frame-shape. The anode electrode 22 is disposed on the other surface 18b of the solid polymer electrolyte membrane 18.

The cathode electrode 20 includes an electrode catalyst layer 20a connected to the surface 18a of the solid polymer electrolyte membrane 18, and a gas diffusion layer 20b which is stacked on the electrode catalyst layer 20a. The anode electrode 22 includes an electrode catalyst layer 22a connected to the surface 18b of the solid polymer electrolyte membrane 18, and a gas diffusion layer 22b which is stacked on the electrode catalyst layer 22a.

The electrode catalyst layers 20a, 22a are formed by printing, coating, or transferring a catalyst paste on both sides of the solid polymer electrolyte membrane 18, the catalyst paste being prepared by mixing catalyst particles uniformly with a solution of a polymer electrolyte, the catalyst particles being formed as carbon black particles supported with platinum particles, and the polymer electrolyte being used as an ion conductive binder. The gas diffusion layers 20b, 22b each composed of carbon paper or the like, and the planar dimension of the gas diffusion layer 20b is set to be smaller than that of the gas diffusion layer 22b.

Figure 3:
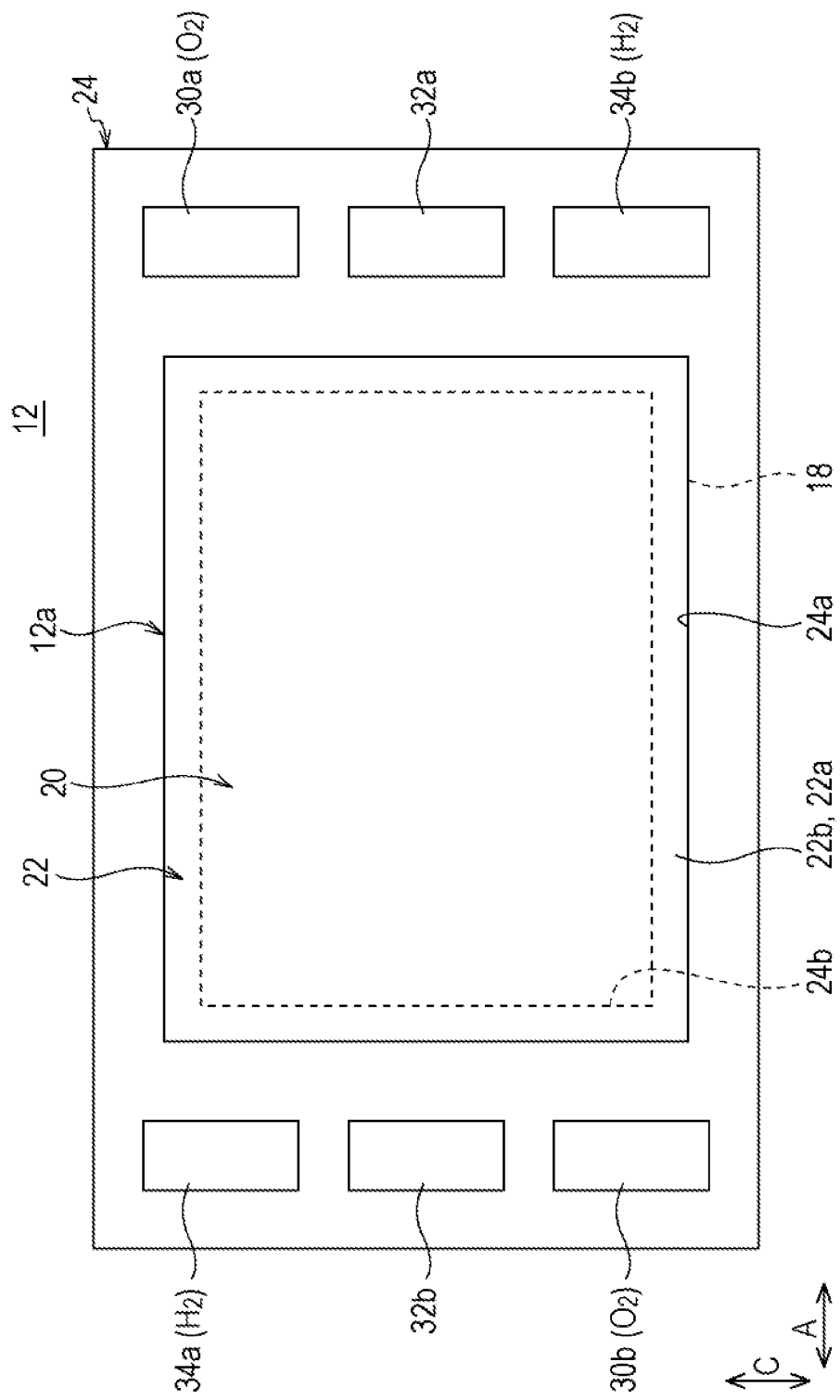
FIG. 3 is a front view of the anode-side electrode of a membrane electrode assembly with a resin frame, which constitutes part of the fuel cell.

As illustrated in FIGS. 1 to 3, the membrane electrode assembly with a resin frame 12 surrounds the outer periphery of the solid polymer electrolyte membrane 18, and includes a resin frame member 24 which is connected to the cathode electrode 20 and the anode electrode 22. The resin frame member 24 may be composed of, for example, PPS (Polyphenylene Sulfide), PPA (Polyphthalamide), or the like, or a polymer material having elasticity.

The resin frame member 24 is provided with a stepped opening (interior space) therein, and includes a first inner circumferential end 24a disposed inwardly, and a second inner circumferential end 24b disposed outwardly of the first inner circumferential end 24a. The resin frame member 24 includes a thin-walled portion 24c between the first inner circumferential end 24a and the second inner circumferential end 24b. The outer circumferential end of the cathode electrode 20 is connected to the first inner circumferential end 24a, and the outer circumferential end of the anode electrode 22 is connected to the second inner circumferential end 24b.

As illustrated in FIG. 2, the cathode-side separator 14 includes a thin-walled portion 14c at the outer circumferential end thereof which is in contact with the resin frame member 24, the thin-walled portion 14c having a thickness L1 which is less than that of the other portions of the cathode-side separator 14, while the anode-side separator 16 includes a thin-walled portion 16c at the outer circumferential end thereof which faces the resin frame member 24, the thin-walled portion 16c having a thickness L2 which is less than that of the other portions of the anode-side separator 16. A space S is formed between the resin frame member 24 and the thin-walled portion 16c of the anode-side separator 16 when the fuel cells 10 stacked (clamped). This is in order to prevent an increase in contact pressure because the contact pressure would be increased if the resin frame member 24 were to be directly sandwiched between the cathode-side separator 14 and the anode-side separator 16.

As illustrated in FIG. 1, at one end of the fuel cell 10 in the direction of an arrow A (horizontal direction in FIG. 1), a plurality of oxidant gas inlet communication holes 30a for supplying an oxidant gas, for example, an oxygen containing gas, a plurality of cooling medium inlet communication holes 32a for supplying a cooling medium, and a plurality of fuel gas outlet communication holes 34b for discharging a fuel gas, for example, a hydrogen containing gas, are arranged and provided in the direction of an arrow C (vertical direction), the plurality of communication holes communicating with each other in the direction of an arrow B, which is the stacking direction.

At the other end of the fuel cell 10 in the direction of the arrow A, a plurality of fuel gas inlet communication holes 34a for supplying a fuel gas, a plurality of cooling medium outlet communication holes 32b for discharging a cooling medium, and a plurality of oxidant gas outlet communication holes 30b for discharging an oxidant gas are arranged and provided in the direction of the arrow C, the plurality of communication holes communicating with each other in the direction of the arrow B.

A surface 14a of the cathode-side separator 14 which faces the membrane electrode assembly with a resin frame 12 is provided with an oxidant gas passage 36 which communicates with the oxidant gas inlet communication hole 30a and the oxidant gas outlet communication hole 30b.

A surface 16a of the anode-side separator 16 which faces the membrane electrode assembly with a resin frame 12 is provided with a fuel gas passage 38 which communicates with the fuel gas inlet communication hole 34a and the fuel gas outlet communication hole 34b. Between a surface 14b of the cathode-side separator 14 and a surface 16b of the anode-side separator 16, there is formed a cooling medium passage 40 which communicates with the cooling medium inlet communication hole 32a and the cooling medium outlet communication hole 32b.

The surfaces 14a, 14b of the cathode-side separator 14 are provided with a first sealing member 42 which surrounds the outer circumferential end of the cathode-side separator 14, and the surfaces 16a, 16b of the anode-side separator 16 are provided with a second sealing member 44 which surrounds the outer circumferential end of the anode-side separator 16.

The first and second sealing members 42 and 44 support a part of the clamping load when the fuel cells 10 are stacked together.

As the material for the first and second sealing members 42, 44, a sealing material, a cushioning material, or a packing material, such as EPDM, NBR, a fluoride rubber, a silicone rubber, a fluoro silicone rubber, a butyl rubber, a natural rubber, a styrene rubber, a chloroprene or acrylic rubber is used.

As illustrated in FIG. 2, the membrane electrode assembly with a resin frame 12 includes a power generation section 46 which is located in the interior space of the resin frame member 24, and has a first membrane portion 18pg of the solid polymer electrolyte membrane 18 in the power generation section 46 that is sandwiched between the cathode electrode 20 and a first portion 22pg of the anode electrode 22; and a stepped section 48 which is located outside the cathode electrode 20, and has a second membrane portion 18s of the solid polymer electrolyte membrane 18 in the stepped section 48 that is sandwiched between a second portion 22s of the anode electrode 22 and the thin-walled portion 24c of the resin frame member 24. Additionally, the cathode-side separator 14 includes a first inner portion 14i in contact with the cathode electrode 20 in the power generation section 46, and the cathode-side separator 14 further includes a first outer portion 14o in contact with the resin frame member 24 in the stepped section 48. Further, the anode-side separator 16 includes a second inner portion 16i in contact with the first portion of the anode electrode 22 in the power generation section 46, and the anode-side separator 16 further includes a second outer portion 16o in contact with the second portion of the anode electrode 22 in the stepped section 48.

Figure 4:
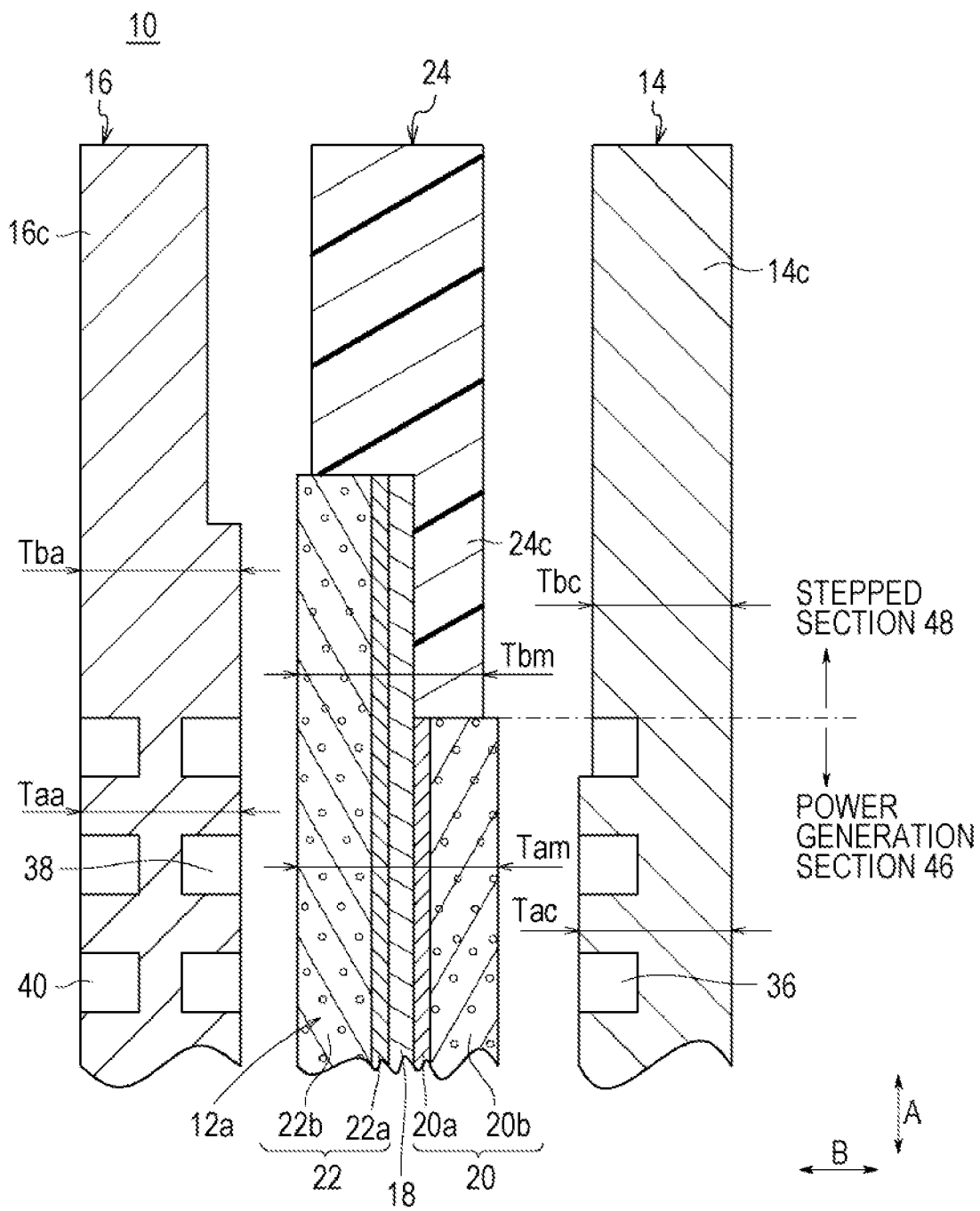
FIG. 4 is a partial cross-sectional view of the membrane electrode assembly with a resin frame, before a cathode-side separator and an anode-side separator are clamped.

In the fuel cells 10 when stacked together, an interference in the stepped section 48 is set to a magnitude lower than that of the power generation section 46. Specifically, as illustrated in FIG. 4, before the fuel cell 10 is assembled, a relationship of Tam+Tac+Taa>Tbm+Tbc+Tba is satisfied, where Tam is the thickness of the power generation section 46 of the membrane electrode assembly with a resin frame 12, Tac is the thickness of the power generation section 46 of the cathode-side separator 14, Taa is the thickness of the power generation section 46 of the anode-side separator 16, Tbm is the thickness Tbm of the stepped section 48 of the membrane electrode assembly with a resin frame 12, Tbc is the thickness of the stepped section 48 of the cathode-side separator 14, and Tba is the thickness of the stepped section 48 of the anode-side separator 16.

More preferably, a relationship of Tam+Tac+Taa−Tcell>2×(Tbm+Tbc+Tba−Tcell) is satisfied, where Tcell is the cell thickness when the fuel cell 10 is clamped.

The operation of the fuel cell 10 configured in this manner will be described in the following.

First, as illustrated in FIG. 1, an oxidant gas such as an oxygen containing gas is supplied to the oxidant gas inlet communication hole 30a, and a fuel gas such as a hydrogen containing gas is supplied to the fuel gas inlet communication hole 34a. In addition, a cooling medium such as pure water, ethylene glycol, or oil is supplied to the cooling medium inlet communication hole 32a.

Therefore, the oxidant gas is introduced from the oxidant gas inlet communication hole 30a into the oxidant gas passage 36 of the cathode-side separator 14 and moves in the direction of the arrow A, and is supplied to the cathode electrode 20 of the stepped MEA12a. On the other hand, the fuel gas is introduced from the fuel gas inlet communication hole 34a into the fuel gas passage 38 of the anode-side separator 16. The fuel gas moves in the direction of the arrow A along the fuel gas passage 38, and is supplied to the anode electrode 22 of the stepped MEA12a.

Consequently, in the stepped MEA12a, the oxidant gas supplied to the cathode electrodes 20 and the fuel gas supplied to the anode electrodes 22 are consumed by an electrochemical reaction in the electrode catalyst layers 20a, 22a, and thus electric power is generated.

Subsequently, the oxidant gas which has been supplied to the cathode electrode 20 and consumed is discharged in the direction of the arrow B along the oxidant gas outlet communication hole 30b. Similarly, the fuel gas which has been supplied to the anode electrode 22 and consumed is discharged in the direction of the arrow B along the fuel gas outlet communication hole 34b.

The cooling medium supplied to the cooling medium inlet communication hole 32a is introduced into the cooling medium passage 40 between the cathode-side separator 14 and the anode-side separator 16, and flows in the direction of the arrow A. The cooling medium, after cooling the stepped MEA12a, is discharged from the cooling medium outlet communication hole 32b.

In this case, as illustrated in FIG. 2, when the fuel cell 10 is compressed (clamped), the interference in the power generation section 46 is Tam+Tac+Taa−Tcell, while the interference in the stepped section 48 is Tbm+Tbc+Tba−Tcell. In the power generation section 46, the surfaces 18a, 18b of the solid polymer electrolyte membrane 18 are respectively provided with the gas diffusion layers 20b, 22b, while in the stepped section 48, only the surface 18b of the solid polymer electrolyte membrane 18 is provided with the gas diffusion layer 22b.

The stepped section 48 has a higher elastic modulus than that of the power generation section 46. For this reason, if the magnitudes of the interferences in the power generation section 46 and the stepped section 48 are the same, a contact pressure which occurs in the stepped section 48 is higher than that which occurs in the power generation section 46. For example, the contact pressure of the stepped section=2×the contact pressure of the power generation section in relation to the thicknesses of the gas diffusion layers 20b, 22b, thus the interference in the stepped section 48 needs to be reduced. Because power is not generated in the stepped section 48, it is desired that the contact pressure of the stepped section 48 be smaller than the contact pressure of the power generation section 46.

Figure 5:
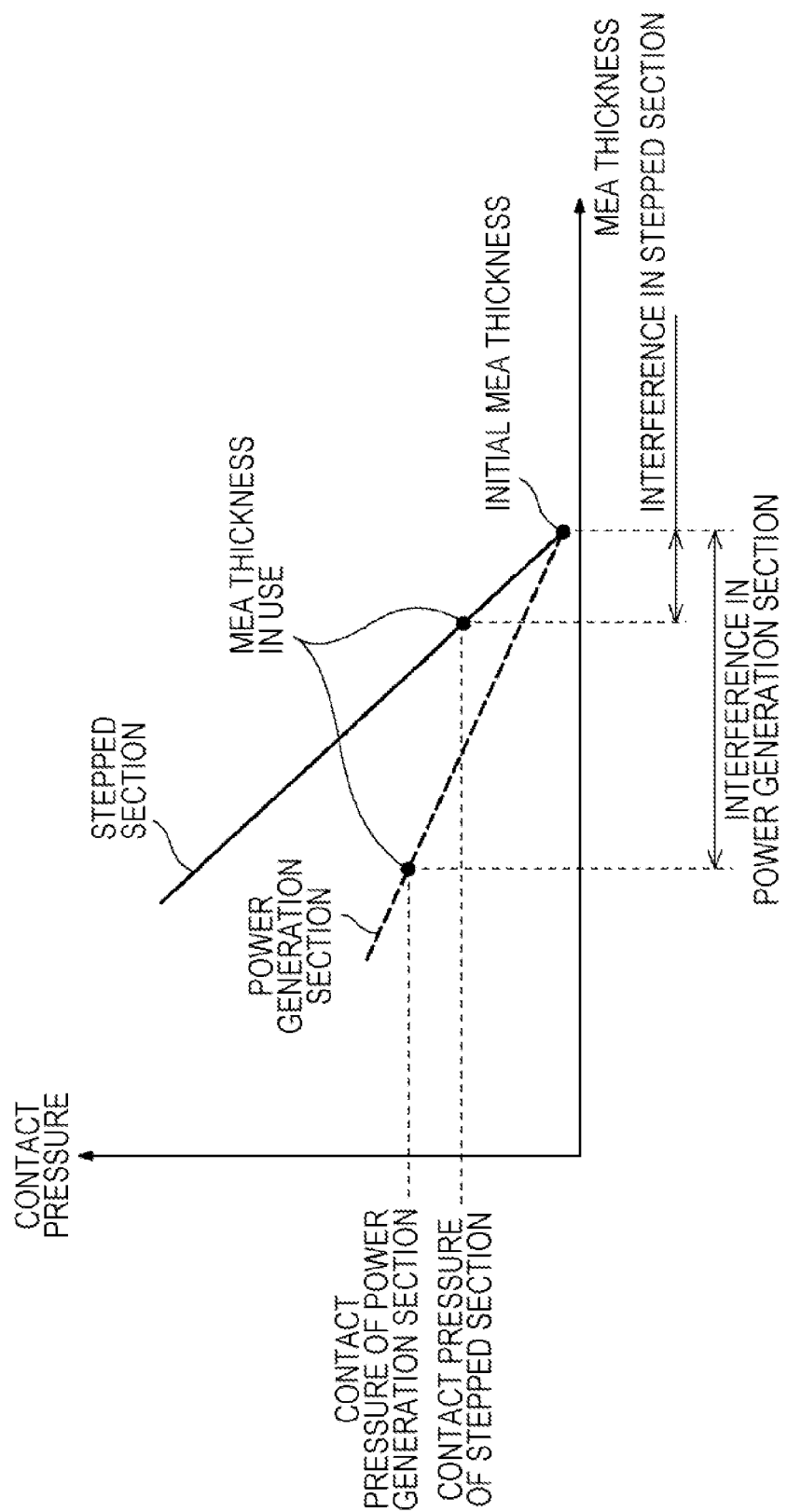
FIG. 5 are graphs which indicate the relationships between MEA thickness and the contact pressure of a power generation section, and the contact pressure of a stepped section.
Figure 6:
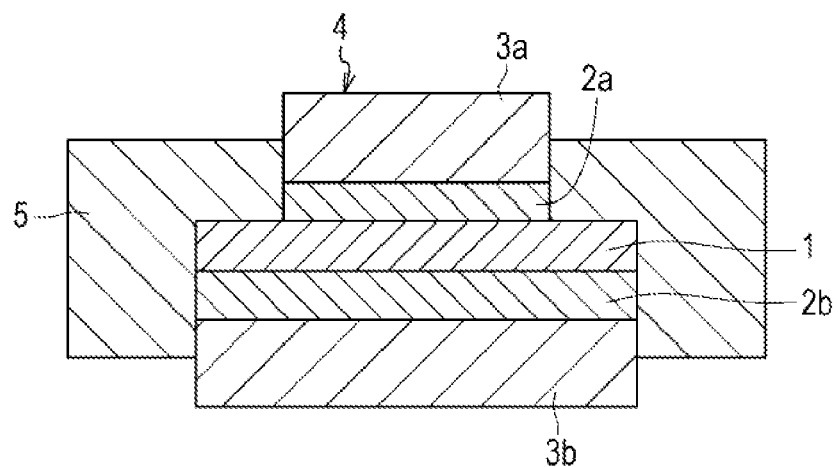
FIG. 6 is an illustration of the membrane electrode assembly disclosed in Japanese Unexamined Patent Application Publication No. 2008-41337.

Thus, by setting the relationship of Tam+Tac+Taa−Tcell>2×(Tbm+Tbc+Tba−Tcell), it can be established that the contact pressure of the power generation section>the contact pressure of the stepped section at the time of clamping. That is to say, as illustrated in FIG. 5, the magnitudes of the interferences in the power generation section and the stepped section that respectively correspond to desired contact pressures of the power generation section and the stepped section are calculated from the relationship between the thickness (MEA thickness) of the stepped MEA12a and the contact pressure.

Consequently, in the power generation section 46, a contact pressure necessary to ensure desired power generation performance can be maintained, and in the stepped section 48, the contact pressure applied to the solid polymer electrolyte membrane 18 can be suppressed. Accordingly, an effect is achieved in which a desired power generation performance is obtained, and breakage (damage) or the like of the solid polymer electrolyte membrane 18 in the stepped section 48 can be favorably prevented.

In the present embodiment, the cathode-side separator 14 and the anode-side separator 16 are respectively provided with thin-walled portions 14c and 16c which are stepped, however, the disclosure is not limited to the above configuration. For example, no steps, i.e., a flat surface may be provided between the power generation section 46 and the stepped sections 48 of the cathode-side separator 14, and the surface of the resin frame member 24, which is in contact with the cathode-side separator 14 may be stepped.

A fuel cell according to the embodiment includes: a membrane electrode assembly with a resin frame which is formed by surrounding an outer periphery of a solid polymer electrolyte membrane with a resin frame member; and separators disposed on both sides of the membrane electrode assembly with a resin frame, both sides of the solid polymer electrolyte membrane being respectively provided with first and second electrodes each having an electrode catalyst layer and a gas diffusion layer, an outer dimension of the first electrode being set to be smaller than an outer dimension of the second electrode.

In the fuel cell according to the embodiment, the membrane electrode assembly with a resin frame includes a power generation section which is located in an interior space of the resin frame member, and has the solid polymer electrolyte membrane sandwiched between the first electrode and the second electrode; and a stepped section which is located outside the first electrode, and has the solid polymer electrolyte membrane sandwiched between the second electrode and the resin frame member, an interference in the stepped section when the fuel cell is stacked being set to a magnitude smaller than an interference in the power generation section. Accordingly, in a power generation section, a contact pressure necessary to ensure desired power generation performance is maintained, while in a stepped section, a contact pressure applied to the solid polymer electrolyte membrane can be suppressed. Thus, a desired power generation performance is obtained, and breakage or the like of the solid polymer electrolyte membrane in the stepped section can be favorably prevented.

When the fuel cell according to the embodiment is stacked, a space is preferably formed between the resin frame member and the separator which is in contact with the second electrode.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
   a membrane electrode assembly comprising:
   a solid polymer electrolyte membrane including a first side surface and a second side surface opposite to the first side surface in a stacking direction;
   a first electrode provided on the first side surface of the solid polymer electrolyte membrane and including an electrode catalyst layer and a gas diffusion layer;
   a second electrode provided on the second side surface of the solid polymer electrolyte membrane and including an electrode catalyst layer and a gas diffusion layer, an outer dimension of the first electrode being set to be smaller than an outer dimension of the second electrode when viewed from the stacking direction; and
   a resin frame member provided to surround an outer periphery of the solid polymer electrolyte membrane, the membrane electrode assembly including a power generation section and a stepped section, the power generation section being located in an interior space of the resin frame member, the solid polymer electrolyte membrane being provided between the first electrode and the second electrode in the power generation section, the stepped section being located on an outer side of the first electrode, the solid polymer electrolyte membrane being provided between the second electrode and the resin frame member in the stepped section;
   a first separator disposed on a first side of the membrane electrode assembly; and
   a second separator disposed on a second side of the membrane electrode assembly,
   wherein thicknesses of the membrane electrode assembly, the first separator, and the second separator are provided such that a contact pressure of the power generation section is greater than a contact pressure of the stepped section when the fuel cell is in a clamped and assembled state,
   wherein the resin frame member includes a frame main body and a thin-walled portion,
   wherein the frame main body is provided to surround the outer periphery of the solid polymer electrolyte membrane,
   wherein the thin-walled portion inwardly extends from an inner periphery of the frame main body and is provided to surround an outer periphery of the first electrode, the thin-walled portion having a thickness thinner than a thickness of the frame main body in the stacking direction,
   wherein the stepped section is composed of the thin-walled portion of the resin frame, the solid polymer electrolyte membrane, and the second electrode,
   wherein the resin frame member directly contacts the first separator,
   wherein the resin frame member has no direct contact with the second separator, and
   wherein a space is provided between the resin frame member and the second separator such that the space extends over a surface of the frame main body to the exterior of the resin frame member, wherein the space provides no direct contact between the resin frame member and the second separator.

2. The fuel cell according to claim 1,
   wherein the second separator is in contact with the second electrode.

3. The fuel cell according to claim 1,
   wherein a length of the stepped section in the stacking direction is set to be smaller than a length of the power generation section in the stacking direction before the first and second separators are assembled to the membrane electrode assembly.

4. The fuel cell according to claim 1,
   wherein the solid polymer electrolyte membrane includes a first membrane portion and a second membrane portion,
   wherein the first membrane portion is provided between the first electrode and the second electrode in the stacking direction, and
   wherein the second membrane portion is provided between the thin-walled portion and the second electrode in the stacking direction.

5. The fuel cell according to claim 4,
   wherein the second electrode includes a first portion and a second portion, wherein the first portion is in contact with the first membrane portion, the first membrane portion being provided between the first portion and the first electrode in the stacking direction, and wherein the second portion is in contact with the second membrane portion, the second membrane portion being provided between the second portion and the thin-walled portion in the stacking direction.

6. The fuel cell according to claim 5, wherein the power generation section includes the first electrode, the first membrane portion of the solid polymer electrolyte membrane, and the first portion of the second electrode, and wherein the stepped section includes the thin-walled portion of the resin frame member, the second membrane portion of the solid polymer electrolyte membrane, and the second portion of the second electrode.

7. The fuel cell according to claim 6, wherein a total thickness of the thin-walled portion, the second membrane portion, and the second portion of the second electrode is set to be thinner than a total thickness of the first electrode, the first membrane portion, and the first portion of the second electrode before the first and second separators are assembled to the membrane electrode assembly.

8. The fuel cell according to claim 6, wherein the first separator includes a first inner portion and a first outer portion, the first inner portion being in contact with the first electrode, the first outer portion being in contact with the resin frame member, wherein the second separator includes a second inner portion and a second outer portion, the second inner portion being in contact with the first portion of the second electrode, the second outer portion being in contact with the second portion of the second electrode, and wherein a total thickness of the thin-walled portion, the second membrane portion, the second portion of the second electrode, the first outer portion of the first separator, and the second outer portion of the second separator is set to be thinner than a total thickness of the first electrode, the first membrane portion, the first portion of the second electrode, the first inner portion of the first separator, and the second inner portion of the second separator before the first and second separators are assembled to the membrane electrode assembly.

9. The fuel cell according to claim 1, wherein, before assembly of the fuel cell, a relationship of Tam+Tac+Taa>Tbm+Tbc+Tba is satisfied, where Tam is a thickness of the power generation section of the membrane electrode assembly with the resin frame member, Tac is a thickness of the power generation section of the first separator, Taa is a thickness of the power generation section of the second separator, Tbm is a thickness of the stepped section of the membrane electrode assembly with the resin frame member, Tbc is a thickness of the stepped section of the first separator, and Tba is a thickness of the stepped section of the first separator.

10. The fuel cell according to claim 9, wherein a relationship of Tam+Tac+Taa−Tcell>2×(Tbm+Tbc+Tba−Tcell) is satisfied, where Tcell is a thickness of the fuel cell after the fuel cell is assembled and clamped.

11. The fuel cell according to claim 1, wherein the resin frame member includes a stepped opening.

12. The fuel cell according to claim 1, wherein the resin frame member is located entirely on the outer side of the first electrode.

13. The fuel cell according to claim 1, wherein the first separator has a step formed therein at a location between the power generation section and the stepped section.

14. The fuel cell according to claim 1, wherein a thickness of the first separator in the power generation section is larger than a thickness of the first separator in the stepped section.

15. A fuel cell comprising:

a membrane electrode assembly comprising:

a solid polymer electrolyte membrane including a first side surface and a second side surface opposite to the first side surface in a stacking direction;

a first electrode provided on the first side surface of the solid polymer electrolyte membrane and including an electrode catalyst layer and a gas diffusion layer;

a second electrode provided on the second side surface of the solid polymer electrolyte membrane and including an electrode catalyst layer and a gas diffusion layer, an outer dimension of the first electrode being set to be smaller than an outer dimension of the second electrode when viewed from the stacking direction; and a resin frame member provided to surround an outer periphery of the solid polymer electrolyte membrane, the membrane electrode assembly including a power generation section and a stepped section, the power generation section being located in an interior space of the resin frame member, the solid polymer electrolyte membrane being provided between the first electrode and the second electrode in the power generation section, the stepped section being located on an outer side of the first electrode, the solid polymer electrolyte membrane being provided between the second electrode and the resin frame member in the stepped section;

a first separator disposed on a first side of the membrane electrode assembly; and a second separator disposed on a second side of the membrane electrode assembly, wherein thicknesses of the membrane electrode assembly, the first separator, and the second separator are provided such that a contact pressure of the power generation section is greater than a contact pressure of the stepped section when the fuel cell is in a clamped and assembled state, wherein the resin frame member includes a frame main body and a thin-walled portion, wherein the frame main body is provided to surround the outer periphery of the solid polymer electrolyte membrane, wherein the thin-walled portion inwardly extends from an inner periphery of the frame main body and is provided to surround an outer periphery of the first electrode, the thin-walled portion having a thickness thinner than a thickness of the frame main body in the stacking direction, wherein the stepped section is composed of the thin-walled portion of the resin frame, the solid polymer electrolyte membrane, and the second electrode, wherein the resin frame member directly contacts the first separator, and wherein a space is provided between the resin frame member and the second separator such that separation between the resin frame member and the second separator extends over an entire surface of the frame main body.

16. A fuel cell comprising:
a membrane electrode assembly comprising:
- a solid polymer electrolyte membrane including a first side surface and a second side surface opposite to the first side surface in a stacking direction;
- a first electrode provided on the first side surface of the solid polymer electrolyte membrane and including an electrode catalyst layer and a gas diffusion layer;
- a second electrode provided on the second side surface of the solid polymer electrolyte membrane and including an electrode catalyst layer and a gas diffusion layer, an outer dimension of the first electrode being set to be smaller than an outer dimension of the second electrode when viewed from the stacking direction; and
- a resin frame member provided to surround an outer periphery of the solid polymer electrolyte membrane, the membrane electrode assembly including a power generation section and a stepped section, the power generation section being located in an interior space of the resin frame member, the solid polymer electrolyte membrane being provided between the first electrode and the second electrode in the power generation section, the stepped section being located on an outer side of the first electrode, the solid polymer electrolyte membrane being provided between the second electrode and the resin frame member in the stepped section;

a first separator disposed on a first side of the membrane electrode assembly; and a second separator disposed on a second side of the membrane electrode assembly, wherein thicknesses of the membrane electrode assembly, the first separator, and the second separator are provided such that a contact pressure of the power generation section is greater than a contact pressure of the stepped section when the fuel cell is in a clamped and assembled state, wherein the resin frame member includes a frame main body and a thin-walled portion, wherein the frame main body is provided to surround the outer periphery of the solid polymer electrolyte membrane, wherein the thin-walled portion inwardly extends from an inner periphery of the frame main body and is provided to surround an outer periphery of the first electrode, the thin-walled portion having a thickness thinner than a thickness of the frame main body in the stacking direction, wherein the stepped section is composed of the thin-walled portion of the resin frame, the solid polymer electrolyte membrane, and the second electrode, wherein the resin frame member directly contacts the first separator, and wherein a space is provided between the resin frame member and the second separator such that the space extends over a surface of the frame main body to the exterior of the resin frame member, wherein the space is an open void such that the resin frame member has no direct contact with the second separator.

* * * * *